US006384138B1

(12) United States Patent
Jacob et al.

(10) Patent No.: US 6,384,138 B1
(45) Date of Patent: May 7, 2002

(54) HOT MELT PRESSURE SENSITIVE ADHESIVE COMPOSITION

(75) Inventors: Lutz E. Jacob, Tervuren; Eddy Swiggers, Meiselaan, both of (BE)

(73) Assignee: ExxonMobil Chemical Patents, Inc., Houston, TX (US)

( * ) Notice: Subject to any disclaimer, the term of this patent is extended or adjusted under 35 U.S.C. 154(b) by 0 days.

(21) Appl. No.: 09/388,514

(22) Filed: Sep. 2, 1999

Related U.S. Application Data

(60) Provisional application No. 60/099,166, filed on Sep. 4, 1998.

(51) Int. Cl.⁷ ............................................... C08L 53/00
(52) U.S. Cl. ......................................................... 525/89
(58) Field of Search ........................................... 525/89

(56) References Cited

U.S. PATENT DOCUMENTS

| | | | |
|---|---|---|---|
| 4,230,842 A | 10/1980 | Bullard et al. | 526/185 |
| 5,143,968 A | 9/1992 | Diehl et al. | 524/534 |
| 5,292,819 A | 3/1994 | Diehl et al. | 525/314 |
| 5,342,858 A | 8/1994 | Litchholt et al. | 521/98 |
| 5,358,783 A | 10/1994 | Diehl et al. | 428/344 |
| 5,523,343 A | 6/1996 | Giordano et al. | 524/505 |

FOREIGN PATENT DOCUMENTS

| | | |
|---|---|---|
| EP | 0 525 905 B | 2/1993 |
| EP | 0 802 251 A1 | 10/1997 |
| WO | WO 85/00616 | 2/1985 |
| WO | WO 95/01408 | 1/1995 |
| WO | WO 96/27644 | 9/1996 |
| WO | WO 99/66000 | 12/1999 |

OTHER PUBLICATIONS

L. Jacob, M. F. Tse, "Pressure Sensitive Adhesives Based on Vector (r) SIS Polymers"–*European Tape and Label Conference*, Brussels, Apr. 29–30, 1993.
Hercules MBG 208 Resin Datasheet, Sep., 1993.
Hercules, Product Literature on Herculite™ Resins, including Material Safety Data Sheets, Apr. 2, 1993.
Goodyear Wingtack ® Extra Technical Data Sheet.
Escorez® Tackifying Resins, Escorez 2596 Petroleum Hydrocarbon Resin Datasheet, Sep., 1993.
Technical Information Leaflet TI–0102–CBJ–2 on ECR–165C Water White, Hydrocarbon Resin Tackifier.
F. C. Jagisch and J. M. Tancredede. "New Styrene Block Copolymers for Tape and Label Use"–PSTC Technical Seminar Proceedings (TECH XIII), May, 1990.
Selection Guide for Hercules Hydrocarbon Resins, Oct., 1993.
F. C. Jagisch, "Advances in Styrene Block Copolymers Technology"–PSTC Technical Seminar Proceedings (TECH XIV) May, 1991.
G. Vermunicht and N. De Keyzer, "High Polystrene Content Styrene–Isoprene Block Copolymers for Hot Melt Adhesives in Pressure Sensitive Tapes", Publication based on a lecture presented at the Conference on Advances in Adhesives and Sealants Technology, Bordeaux, France, Sep. 20–21, 1994.
*Encyclopedia of Chemical Technology*, Kitk–Othmer, 4th edition, vol. 13, pp. 717–742 (1995) "Hydrocarbon Resins".
Technical Information leaflet TI–0108–CLS–1, ESCOTEZ® 2596 vs. WINGTACK EXTRA in VECTOR® PSA Formulations.
Technical information leaflet TI–0105–CBJ–1 (ECR–165).
Technical Information leaflet TI–0076–CLS/MEA–3 (ESCOREZ® 2596).

*Primary Examiner*—Terressa M. Boykin
(74) *Attorney, Agent, or Firm*—Charles Edwin Runyan, Jr.; David J. Alexander

(57) ABSTRACT

A hot melt pressure sensitive adhesive for use with oriented polypropylene films is provided. The adhesive composition comprises an elastomeric component which is a blend of styrene-isoprene block copolymers and styrene-butadiene block copolymers mixed with a tackifier component. The tackifier component is a blend of at least two hydrocarbon resins, the first being compatible with the styrene-isoprene block copolymer and the second being compatible with the styrene-butadiene block copolymer.

25 Claims, No Drawings

HOT MELT PRESSURE SENSITIVE ADHESIVE COMPOSITION

This application is based on U.S. Provisional Application Serial No. 60/099,166 filed Sep. 4, 1998.

FIELD OF INVENTION

This invention is related to a novel hot melt pressure sensitive adhesive composition for use with oriented polypropylene films. Specifically, the invention relates to a composition comprising a blend of SIS and SBS block copolymers combined with a blend of hydrocarbon resins which result in a low cost adhesive with properties similar to those made with SIS alone.

BACKGROUND OF THE INVENTION

Packaging tape is one of the largest volume applications for pressure sensitive adhesives. While paper tapes and vinyl film tapes have been traditionally used in packaging, there has been increased interest in the use of oriented polypropylene films, particularly biaxially oriented polypropylene films.

Of the different adhesives used with oriented polypropylene films, block copolymer based hot melt adhesives are the most popular. These adhesives are generally based on styrene-isoprene block copolymers because of their superior performance over time. One draw back of such adhesive compositions is that they are relatively expensive when compared to adhesives based on other block copolymers such as styrene-butadiene block copolymers.

Styrene-butadiene block copolymer based adhesive compositions have been tried with oriented polypropylene tapes without success. While the initial adhesive properties are acceptable, the aged properties decline rapidly when compared to SIS based adhesive compositions. Furthermore, the required adhesion to paperboard was not achieved.

It would be useful; therefore, to develop an adhesive composition for use with oriented polypropylene tapes having the properties of a SIS based adhesive at a lower cost. The invention described herein accomplishes this by blending SIS block copolymers with SBS block copolymers. The hydrocarbon tackifier resin used must also consist of a blend of a SIS compatible resin and a SBS compatible resin. The resulting adhesive has the properties of an adhesive based on SIS alone but at a significantly lower cost.

U.S. Pat. No. 5,523,343 discloses a pressure sensitive hot melt adhesive composition comprising a blend of a radial SBS copolymer and a SIS block copolymer. The composition also includes a tackifier resin and plasticizer oils. The patent is silent concerning the use of a blended tackifier resin

SUMMARY OF THE INVENTION

The adhesive composition of the present invention comprises an elastomeric component and a tackifying resin component. The elastomeric component in turn comprises a blend of Styrene-Isoprene (SIS) block copolymers and Styrene-Butadiene (SBS) block copolymers. The SIS copolymer comprises from 20 to 80 wt % of the elastomeric component while the SBS copolymer comprises from 80 to 20 wt % of the elastomeric component. The preferred ranges of the SIS copolymer are from 30 to 80 wt %, more preferable 50 to 80 wt %. The preferred ranges of the SBS copolymer are from 70 to 20 wt %, more preferable 50 to 20 wt %.

The tackifier component comprises a blend of at least two hydrocarbon tackifier resins, the first comprising a resin compatible with SIS block copolymers and the second comprises a resin compatible with SBS copolymers. In the preferred embodiment, the relative ratios of the two resins should be similar to that for the block copolymers in the elastomeric component.

In the adhesive composition, the elastomeric component comprises from 40 to 60 wt %, with 45 to 55 wt % being preferred and 45 to 50 wt. % most preferred. The tackifying resin component comprises from 40 to 60 wt %, with 45 to 55 wt % preferred and 50 to 55 wt % most preferred. In the practice of the invention, the total amount of tackifier component in the final adhesive composition may exceed that of the elastomeric component. Thus, in practice, the tackifier component may exceed 100 wt. % based on the total elastomer component.

Typical performance characteristics achieved by the adhesive compositions of the present invention when applied to BOPP films at the coating weight of 20 grams/cm$^2$ include (i) shear on cardboard at 40° C., minimum 10 hours average and (ii) Ball tack, maximum 4 cm.

DETAILED DESCRIPTION OF THE INVENTION

The invention relates to a novel hot melt pressure sensitive adhesive useful in the manufacture of packaging tapes manufactured with oriented polypropylene films. Specifically, the adhesive comprises an elastomeric component, which in turn comprises a blend of SIS and SBS block copolymers, and a tackifier component, which comprises a blend of a SIS compatible hydrocarbon resin and a SBS compatible hydrocarbon resin. The resulting adhesive exhibits the same attributes as adhesives produced from SIS alone at reduced manufacturing costs.

The Elastomeric Component

The elastomeric component comprises a blend of SIS and SBS block copolymers. The SIS block copolymer ranges from 20 to 80 wt %, preferably 30 to 80 wt % and more preferably 50 to 80 wt % of the Elastomeric Component and the SBS block copolymer comprises from 80 to 20 wt %, preferably 70 to 20 wt % and more preferably 50 to 20 wt % of the Elastomeric component.

The SIS block copolymer used in the Elastomeric Component of the adhesive is a thermoplastic elastomer having the structure $(S-I)_{n-1}S$ wherein S is substantially a polystyrene block, I is substantially a polyisoprene block and n is an integer of from 2 to 10 wherein the content of the polystyrene in the thermoplastic elastomer ranges from 10 to about 30 wt % and wherein the number average molecular weight (Mn) of the thermoplastic elastomer ranges from about 50,000 to about 500,000. The preferred SIS block copolymer used in the invention is a triblock copolymer of the formula above wherein n=2, i.e., a linear polymer of the formula S-I-S wherein S is substantially a polystyrene block and I is substantially a polyisoprene block. These block copolymers may be prepared by well known anionic solution polymerization techniques using lithium-type initiators such as disclosed in U.S. Pat. Nos. 3,251,905 and 3,239,478, the complete disclosure of which is hereby incorporated by reference for purposes of United States practice.

Preferred block copolymers have a number average molecular weight (determined by GPC) in the range of from about 50,000 to 500,000, more preferably from about 90,000 to about 250,000, even more preferably 90,000 to 175,000 and most preferably 90,000 to 135,000. These block copolymers contain from about 10 to 30 wt % polymerized styrene, more preferably from about 15 to 25 wt % polymerized styrene and most preferably from about 16 to 20 wt % polymerized styrene.

The SIS block copolymer may also comprise a blend of two different SIS copolymers, one having a polystyrene block content of 10 to 20 wt % and the other having a different styrene content of from 15 to 35 wt %, blended to a ratio in the range of from 10:1 to 1:10 parts by weight. The use of two different SIS block copolymers offers the advantage of improved cohesive strength and more precisely tailoring polystyrene content in the preferred target range of from 15 to 25 wt %, or 16 to 20 wt % respectively.

Although pure triblock SIS copolymer is preferred (one having less than 0.1 wt % of diblock polymer) the SIS copolymer may also contain from about 0.1 to about 65 wt %, preferably less than or equal to 25 wt %, most preferably less than 20 wt % of the triblock copolymer of diblock copolymer having the structure S-I and containing from about 10 to 30 wt % polystyrene block. This material may be present as an impurity in the manufacture of the triblock copolymer or may be separately blended with the triblock as a further technique for achieving target polystyrene content or modifying the cohesive properties of the composition. Preferred number average molecular weights of the diblock SI copolymers range from about 100,000 to about 250,000.

While linear triblock SIS copolymers are preferred in the practice of this invention, radial SIS block copolymers may also be used. The radial SIS copolymers should have the same styrene levels as the linear copolymers discussed above, e.g., from about 10 to 30 wt % polymerized styrene. Radial SIS copolymers useful in the practice of the invention will have a molecular weight (Mn) of 180,000 to 250,000.

These linear and radial SIS block copolymers are available commercially and are prepared in accordance with methods known in the art. Examples of SIS copolymers useful in the practice of this invention include Vector™ 4111, Vector™ 4511 and Vector™ 4113, manufactured by Dexco Polymers, LLP, Kraton™ D 1107, Kraton™ D 1160 and Kraton™ D 1161 manufactured by Shell Chemical Company; Europrene™ SOL T 190 and Europrene™ SOL T 193 from Enichem: and Quintac™ 3421, Quintac™ 3422 and Quintac™ 3433 from Nippon Zeon. An example of a radial block copolymer useful in the practice of this invention are Quintac™ 3450 made by Nippon Zeon and Kraton™ 1124 made by Shell Chemical and DPX 552 and 556, both available from Dexco Polymers, LLP.

Particularly preferred SIS block copolymers used in this invention have a melt flow rate in the range of from about 5 to 40 g/10 min., as measured by ASTM D 1238–82 using condition G (200° C., 5 kg. weight).

The SBS block copolymer used in the Elastomeric Component of the adhesive is a thermoplastic elastomer having the structure S-B or (S-B)$_{n-1}$S wherein S is substantially a polystyrene block, B is substantially a polybutadiene block and n is an integer of from 2 to 10 wherein the content of the polystyrene in the thermoplastic elastomer ranges from 10 to about 40 wt % and wherein the number average molecular weight (Mn) of the thermoplastic elastomer ranges from about 50,000 to about 500,000. The preferred SBS block copolymer used in the invention is a triblock copolymer of the formula above wherein n=2, i.e., a linear polymer of the formula S-B-S wherein S is substantially a polystyrene block and is substantially a polybutadiene block. These block copolymers may be prepared by well known anionic solution polymerization techniques using lithium-type initiators such as disclosed in U.S. Pat. Nos. 3,251,905 and 3,239,478, the complete disclosure of which is hereby incorporated by reference for purposes of United States practice. Radial SBS copolymers may also be used in the practice of the invention.

Preferred block copolymers have a number average molecular weight (determined by GPC) in the range of from about 50,000 to 500,000, more preferably from about 100,000 to about 180,000, even more preferably 110,000 to 160,000 and most preferably 110,000 to 140,000.

Although pure triblock SBS copolymer is preferred (one having less than 0.1 wt % of diblock polymer) the SBS triblock copolymer may also contain from about 0.1 to about 35 wt %, preferably less than or equal to 25 wt %, most preferably less than 20 wt % of the triblock copolymer of diblock copolymer having the structure S-B and containing from about 10 to 30 wt % polystyrene block. This material may be present as an impurity in the manufacture of the triblock copolymer or may be separately blended with the triblock as a further technique for achieving target polystyrene content or modifying the cohesive properties of the composition. Preferred number average molecular weights of the diblock SB copolymers range from about 100,000 to about 250,000.

These linear and radial SBS block copolymers are available commercially and are prepared in accordance with methods known in the art. Examples of SBS copolymers useful in the practice of this invention include Vector 8505™, Dexco Polymers, LLP, Kraton™ D 1102, manufactured by Shell Chemical Company; Europrene™ SOL T 166 manufactured by Enichem and Finaprene™ 411 manufactured by Fina. Examples of radial SBS copolymers useful in the practice of the invention include Kraton™ D 4141 and Kraton™ D 4158.

The Tackifier Component

As discussed above, the Tackifier component may comprises a blend of at least two hydrocarbon-tackifying resins. The first is a resin compatible with the SIS copolymer and the second is a resin compatible with the SBS copolymer. The SIS compatible resin is present in an amount ranging from 20 wt % to 80 wt %, preferably 30 to 80 wt %, more preferably 50 to 80 wt % based on the entire tackifier component. Similarly, the SBS compatible resin is present in an amount ranging from 80 to 20 wt %, preferably 70 to 20 wt %, more preferably 50 to 20 wt %. In the preferred embodiment, the amount of resin present will be proportional to the amount of the compatible copolymer present. For example if the SIS copolymer comprises 20 wt % of the Elastomeric Component, then the SIS compatible resin will comprise 20 wt % of the Tackifier composition. Similarly, if the SBS copolymer comprises 80 wt % of the Elastomeric Component, then the SBS compatible resin will comprise 80 wt % of the Tackifier component.

Other ratios, however, are possible within the scope of the invention. For example, the SBS compatible resin can be higher in proportion than the SBS block copolymer, i.e., at 30% SBS, the SBS compatible resin could be also 50% of the resin composition. Vice versa at 50% SBS, the SBS compatible resin could also be 30%. The most preferred ratio is the one mentioned in the application, but we need the flexibility for ratios as mentioned above.

The SIS compatible resin used in this invention is preferably a petroleum resin prepared by the polymerization of a petroleum cracked distillate generally boiling in the range of 25° C. to 80° C. and a monovinyl aromatic monomer having 8 or 9 carbon atoms in the proportions to yield a resin containing 20 wt % or less of the monovinyl aromatic compound as determined by Nuclear Magnetic Resonance analysis. The monovinyl aromatic content may range from 5 to 20 wt % and desirably from 5 to 15 wt %. The petroleum-cracked distillate comprises a mixture of saturated and unsaturated monomers, the unsaturated monomers being monoolefins and diolefins and although the unsaturated materials are predominantly $C_5$, some higher and lower material such as $C_6$ olefins and diolefins may be present. The distillate may also contain saturated or aromatic materials, which can act as a polymerization solvent.

The SIS compatible tackifiers will generally have a ring and ball softening point of from 50 to 140° C., preferably 85 to 105 and most preferred, 90 to 100. The number average molecular weight (Mn) will range from 700 to 1500, with 800 to 1200 preferred. The weight average molecular weight (Mw) shall range from 1200 to 2000, with 1300 to 1700 preferred. The molecular weight distribution (Mw/Mn) will range from 1.3 to 2.5 with 1.8 preferred. The Z average value (Mz) may range from 2500 to 5000 with 3000 to 4000 preferred.

The preferred monovinyl aromatic monomer is styrene, which may be substituted, in the aromatic group. Alternatively, alpha-methyl styrene or vinyl toluene may be used. Commercially available mixtures of vinyl aromatic monomers may be used as well.

The resins are conveniently prepared by Friedel-Crafts catalyzed polymerization in which the mixture of cracked distillate and monoaromatic monomer are treated with 0.25–2.5 wt. % of a catalyst such as aluminum chloride, aluminum boride, or solutions, slurried or complexes thereof or borontrifloride. The polymerization mixture may also include from about 10 to 100 wt % of a chain transfer agent such as diisobutene oligomer to obtain resins having a narrow molecular weight distribution. These reactions are generally carried out at temperatures in the range of 0° to 120°, preferably 0° to 80°, more preferably 20° to 55° C., the conditions being controlled to yield a resin of the required softening point. Residual catalyst is quenched by suitable methods such as the addition of methyl alcohol and subsequent filtration followed by water and/or caustic washing. The final solution may then be stripped of unreacted hydrocarbons and low molecular weight oils by vacuum or steam distillation.

The most preferred SIS tackifier resins have ring and ball softening points in the range of from about 85° to about 105° C., more preferably in the range of from about 90° to about 100° C. and a monovinyl aromatic monomer (e.g., styrene) content in a range from 5 to 15 wt %, or in a range from 6 to 12 wt %, and preferably less than 10 wt. %.

A particularly preferred SIS compatible tackifier for use in the present invention has the following typical properties:

| | |
|---|---|
| Softening Point (° C.) | 92 |
| Gardner Color | 3 |
| Styrene Content (NMR) % | 7–10 |
| Mn (number average MW) | 1150 |
| Mw (weight average MW) | 2020 |
| Mw/Mn (molecular weight distribution) | 1.75 |
| MZ (Z average MW) | 3700 |

These resins and their method of manufacture are more generally disclosed in U.S. Pat. No. 4,078,132, the complete disclosure of which is hereby incorporated by reference for the purpose of U.S. patent practice.

Alternatively, the SIS compatible resin may comprise a petroleum resin prepared in a manner similar to that described above, but where the monovinyl aromatic monomer is generally absent. These resins are prepared from $C_5$ monoolefins and diolefins and are generally referred to as aliphatic resins. Typical aliphatic resins have a ring and ball softening point of from 80 to 115° C.; a number average molecular weight of from 600 to 1200 and an aromaticity level of less than 4 wt. %.

Examples of commercially available SIS compatible tackifier resins include ESCOREZ 2203, ESCOREZ 1310, ECR 411 AND ESCOREZ 2596, manufactured by Exxon Chemical Company; Piccotac 212 and Hercotac 1148, manufactured by Hercules. Inc.; Quintone D and Quintone U 185 manufactured by Nippon Zeon; Marukares R100 manufactured by Maruzen; and Wingtack Extra and Wingtack Plus manufactured by Goodyear Tire and Rubber Company.

The SBS compatible resin used in this invention is preferably a petroleum resin prepared by the polymerization of a petroleum cracked distillate generally boiling in the range of 25° C. to 80° C. and an olefinically unsaturated aromatic monomer having 8 or 10 carbon atoms in the proportions to yield a resin containing from 20 to 45 wt % of the olefinically unsaturated aromatic compound as determined by Nuclear Magnetic Resonance analysis. The petroleum-cracked distillate comprises a mixture of saturated and unsaturated monomers, the unsaturated monomers being monoolefins and diolefins and although the unsaturated materials are predominantly $C_5$, some higher and lower material such as $C_6$ olefins and diolefins may be present. The distillate may also contain saturated or aromatic materials, which can act as a polymerization solvent.

The preferred olefinically unsaturated aromatic monomer is styrene, which may be substituted, in the aromatic group. Alternatively -methyl styrene, vinyl toluene, indene and mixtures may be used.

One source for the olefinically unsaturated compound is heart cut distillate (HCD) obtained by fractionation. The typical composition of HCD is as follows:

| | |
|---|---|
| Total vinyl aromatics | 50 wt % |
| Dicyclopentadiene | 1 wt % |
| Higher boiling point than naphthalene | 15 wt % |
| Dihydro + tetrahydro DCPC | 8 wt % |
| Non-polymerizable aromatics | balance |

The resins are conveniently prepared by Friedel-Crafts catalyzed polymerization in which the mixture of cracked distillate and olefinically unsaturated aromatic monomer are treated with 0.1–3 wt. %, preferably 0.5 to 1.5 wt %, of a catalyst such as aluminum chloride, aluminum boride, or solutions, slurried or complexes thereof or borontrifloride. The polymerization mixture may also include from about 10 to 100 wt % of a chain transfer agent such as diisobutene oligomer to obtain resins having a narrow molecular weight distribution. These reactions are generally carried out at temperatures in the range of −20° to 120°, preferably 30° to 80°, the conditions being controlled to yield a resin of the required softening point. Residual catalyst is quenched by suitable methods such as the addition of methyl alcohol and subsequent filtration followed by water and/or caustic washing. The final solution may then be stripped of unreacted hydrocarbons and low molecular weight oils by vacuum or steam distillation.

The most preferred SBS tackifier resins have ring and ball softening points in the range of from about 50° to about 100° C., more preferably in the range of from about 70° to about 95° C and a olefinically unsaturated aromatic monomer (e.g., styrene) content of from 20 to 45 wt %, preferably greater than 22 wt %. Other suitable tackifier resins include rosins and esterified rosins, such as those described in U.S. Pat. No. 5,820,749, the complete disclosure of which is hereby incorporated by reference for purposes of United States practice.

A particularly preferred SBS compatible tackifier for use in the present invention has the following typical properties:

| | |
|---|---|
| Softening Point (° C.) | 88° C. |
| Gardner Color | 6.5 |
| Styrene Content (NMR) % | 30.8 |
| Mn (number average MW) | 775 |
| Mw (weight average MW) | 1135 |
| Mw/Mn (molecular weight distribution) | 1.5 |
| Mz (viscosity average MW) | 1860 |

These resins and their method of manufacture are more generally disclosed in U.S. Pat. No. 4,078,132, the complete disclosure of which is hereby incorporated by reference for the purpose of U.S. patent practice.

Examples of commercially available SBS compatible tackifier resins include ESCOREZ 2101, ESCOREZ 5690, and ECR 373, manufactured by Exxon Chemical Company; Regalrez 5095 and Regalrez 3102 manufactured by Hercules. Inc.; Quintone U 190 manufactured by Nippon Zeon; and Wingtack 86 manufactured by Goodyear Tire and Rubber Company, Sylvalite RE 885 and Sylvatac RE 85 available from Arizona Chemical and Staybelite Ester 3 and Pentalyn H available from Hercules.

In the case of both the SIS compatible resins and the SBS compatible resins, the resins may be hydrogenated to reduce the levels of residual unsaturation. Hydrogenation results in reducing the color of the resins. Methods for hydrogenating petroleum resins are well known in the art and include the methods described in U.S. Pat. Nos. 4,629,766, 3,926,878 and 5,820,749. As with the non-hydrogenated resins, the styrene content and MW of the resin appears to be the key to compatibility with the SIS or SBS copolymers.

Other Components

The adhesive compositions of the invention may also include other additives known in the art such as hydrocarbon extender oils, antioxidants, colorants, fillers and the like.

Suitable extender oils include aromatic, naphthenic or paraffinic oils and mixtures thereof. When used, the extender oil is added at a level from about 0.5 to about 25 wt percent of the elastomeric component, more preferably from about 5 to 15 wt %.

Suitable antioxidants include hindered phenols such as 2,6-di-t-butyl4-methylphenol; 1,3,5-trimethyl-2,4,6-tris (3', 5'-di-t-butyl-4'-hydroxybenzyl)-benzene; tetrakis [(methylene(3,5-di-t-butyl-4-hydroxyhydrocinnamate)] methane (IRGANOX™ 1010); octadecyll-3,5-di-t-butyl-4-hydroxy cinnamate (IRGANOX™ 1076); and like known materials. Where present, the antioxidant is used at a preferred level of from 0.05 to about 2.0 wt % based on the elastomeric component.

The components of the adhesive composition may be blended by mixing them using any suitable mixing device at a temperature above the melting point of the components, e.g. at 130 to 180° C. for a period of time sufficient to form a homogeneous mixture, normally 1 to 120 minutes depending on the type of mixing device.

In the case of continuous mixing such as practiced by most commercial manufacturers, a twin screw extruder is used to mix the adhesive components. First the elastomers are introduced into the extruder and mixed until the polymers have melted and are well mixed. Then the tackifiers are added followed by any oils which might be desired. To the extent pigments and antioxidants are used, they are normally blended in with the elastomers. The total mixing time is typically 1.5 to 2.0 minutes.

In the case of batch mixing, such as in the examples below, both polymers are added along with 20% of the tackifier component. When the polymers and tackifier reaches a homogeneous state, the remaining tackifier component is gradually added to the mix. Once all the tackifier component has been added and homogeneous mix is achieved, the balance of the plasticizer oil, antioxidants and any pigments are added. The total mixing time may run for up to 120 minutes.

The adhesive composition of this invention may be applied to a substrate as a melt then cooled using conventional procedures. The substrate in the present case is an oriented polypropylene film prepared using conventional techniques known in the art. Examples of suitable film include biaxially oriented polypropylene. The film thickness may vary from 12.5 to 112 $\mu$m and desirably from 10 to 110 $\mu$m depending on the film use and the proposed end use. For example, packaging tapes made with biaxially oriented polypropylene will often have a film thickness from 25 to 35 $\mu$m whereas strapping tapes made with mono-oriented polypropylene films will range from 40 to 112 $\mu$m.

The adhesive composition is applied to the substrate using conventional coating techniques such as roller coaters, die coaters and blade coaters, generally at a temperature of from 150° to 200° C. For example, the ready mixed Hot Melt Pressure Sensitive Adhesive (HMPSA) heated to the temperature where it can flow readily, usually temperatures from 170° to 190° C., can be applied to oriented polypropylene by any known techniques, preferably using a slot die.

A slot die is a closed system where the HMPSA is pumped through by a positive displacement pump. The slot die usually includes a rotating bar at the point of the outlet of the HMPSA in order to maintain a smooth surface.

Due to required thin channels inside the die through which the HMSPA has to flow, it is obvious that there are melt viscosity limits for the HMPSA depending upon required throughput. Thus one can say that, the higher the coating speed is, the lower the melt viscosity needs to be to obtain consistent and even coating at the desired thickness on the film.

The substrate should be coated with sufficient adhesive composition to provide a dry coat weight of from 10 to about 40 g/cm$^2$. Generally, in the manufacture of tapes using oriented polypropylene, a dry coat weight of from about 10 to 30 g/cm$^2$ is used.

After coating, the coated film is slit to the required dimension. In the manufacture of tape, the film is slit into strips and rolled into a finished product. The film may also be cut into shaped items to provide labels or medicinal tapers.

EXAMPLES

The following examples are illustrative of the invention. Materials used in the preparation of the adhesive compositions as identified in the examples are as follows:

| | |
|---|---|
| VECTOR 4111 SIS | A linear polystyrene-polyisoprene-polystyrene triblock copolymer supplied by Dexco Polymers having a styrene content of 17.5 to 19 wt %, melt flow rate of 9.7–13.8 g/10 min, a number average Mol. Wt of 125 + 2% and 0 wt % diblock (SI).[1] |
| VECTOR 8508 | A linear polystyrene-polybutadiene-polystyrene triblock copolymer supplied by Dexco Polymers having a styrene content of 27.5 to 30.0 wt %, melt flow rate of 10.0 to 15.0 g/10 min. and 0 wt % diblock (SB). |
| Kraton 1107 | A linear polystyrene-polyisoprene-polystyrene triblock copolymer supplied by Shell Chemical Company having a styrene content of 15 wt %, and 18 wt % diblock (SI). |
| Cariflex TR 1102 | A linear polystyrene-polybutadiene-polystyrene triblock copolymer supplied by Shell Chemical Company. |
| Escorez 2203 | An aliphatic/aromatic hydrocarbon resin made by Exxon Chemical Company, having a ring and ball softening point of 92° C., a styrene content of 8–10 wt %, and a number average molecular weight of about 1150. |
| ECR 373 | A petroleum resin supplied by Exxon Chemical Company containing about 30 wt % styrene and having a number average molecular weight of 72° and a ring and ball softening point of 90° C. |
| Escorez 1310 | An aliphatic hydrocarbon resin supplied by Exxon Chemical Company having a ring and ball softening point of 93° C., a styrene content of about 0.3 wt % and a number average molecular weigh to 750. |
| FLEXON 876 | A paraffinic extender oil available from Exxon Company. |
| IRGANOX 1076 | An antioxidant compound supplied by Ciba Specialty Chemicals. |
| IRGANOX 565 | An antioxidant compound supplied by Ciba Specialty Chemical. |

[1]Note: styrene contents, molecular weights and melt flow rates were measured in accordance with the methods described in U.S. Pat. No. 5,143,968

The various test methods identified in the tables are as follows:

Ball Tack is measured by Pressure Sensitive Tape Council (PSTC) 6 test.

180° Peel Strength is measured by PSTC 1 test.

Loop Tack is measured by FINAT-9 test.

Viscosity is measured by ASTM D-3236 test.

Shear is measured by suspending a 1000 gram weight vertically from a 25 mm wide strip of oriented polypropylene film with the adhesive formulation which is adhered to a stainless steel plate or cardboard surface with a contact area of 12.5×25 mm. The sample is either stored at room temperature or placed in a ventilated oven at 40° C. Time is recorded until stress failure occurs. Typically, these tests are made and recorded individually to determine reliability of the holding power.

Shear Adhesion Failure Test (SAFT) is determined by adhering a coated BOPP strip of 25 mm width to stainless steel with a contact area of 12.5×25 m, hanging the samples in an oven at 25° C. and suspending a 500 gram weight from the bottom of the strip. The temperature is raised at 0.4° C./min intervals and the bond failure temperature is measured. The Shear Adhesion Temperature is the average of three tests.

Examples 1–10

A series of adhesive compositions were prepared by mixing the ingredients as set forth in Table 1 in a two blade mixer at 145° C. for a period of 70 minutes. The composition was then heated to a temperature of 190° C. and then pumped through a coating die onto a 36 micron OPP film. The dry weight of the applied coating layer ranged from about 19 to 24 dg/m$^2$. After coating the tacky side of the film was laminated to a release paper and the film was wound and cut.

Formulation and physical properties for the various formulations are shown in Table 1. For comparison, the physical properties for a typical commercial tape using an acrylic film are shown.

As is evident from the physical property data in Table 1, Mylar films using the adhesive compositions of the invention all show acceptable performance, especially shear on cardboard at 40° and tack retention (both loop tack and ball tack) after three days of aging.

TABLE 1

| | Ex. 1 | Ex. 2 | Ex. 3 | Ex. 4 | Ex. 5 | Ex. 6 |
|---|---|---|---|---|---|---|
| V 8508 | 80 | 70 | 60 | 50 | 40 | 80 |
| V4111 | 20 | 30 | 40 | 50 | 60 | 20 |
| ECR 373 | 50 | 50 | 50 | 50 | 50 | 80 |
| E 2203 | 50 | 50 | 50 | 50 | 50 | 20 |
| Flexon 876 | 10 | 10 | 10 | 10 | 10 | 10 |
| Irganox 565 | 1 | 1 | 1 | 1 | 1 | 1 |
| 180° C. Peel Strength on steel (N/cm) | | | | | | |
| initial | 6.51 | 6.35 | 6.24 | 5.95 | 6.45 | 6.24 |
| 3 days open air | 6.27 | 6.20 | 5.97 | 6.16 | 6.00 | 5.81 |
| 1 week open air | 5.36 | 5.23 | 4.96 | 4.93 | 4.61 | 4.77 |
| Loop Tack on steel at RT (N/26 mm) | | | | | | |
| Initial | 15.7 | 17.0 | 18.0 | 17.7 | 16.6 | 16.5 |
| 3 days open air | 12.1 | 10.7 | 13.1 | 13.3 | 13.9 | 9.9 |
| 1 week open air | 2.4 | 2.9 | 2.8 | 5.0 | 2.9 | 2.5 |
| Loop Tack at 5° C. (N/25 mm) | | | | | | |
| Steel | 4.1 | 3.2 | 4.4 | 8.1 | 14.1 | 14.6 |
| Cardboard | 4.5 | 5.7 | 5.2 | 5.6 | 5.8 | 5.5 |
| Ball Tack (cm) | | | | | | |
| Initial | 13.5 | 4.0 | 2.5 | 2.0 | 2.5 | 2.0 |
| 3 days open air | 8.0 | 7.0 | 9.5 | 6.5 | 8.5 | 12.5 |
| 1 week open air | >15 | >15 | >15 | >15 | >15 | >15 |

TABLE 1-continued

| | | | | | | |
|---|---|---|---|---|---|---|
| Shear at RT (hours) | | | | | | |
| Cardboard 25 mm × 12.5 mm 1 Kg | >120 | >120 | >120 | >120 | >120 | >120 |
| | >120 | >120 | >120 | >120 | >120 | >120 |
| Shear at 40° C. (hours) | | | | | | |
| Cardboard 25 mm × 12.5 mm 1 Kg | >50 | >50 | 30 h 36 m | >50 | 39 h 30 m | 30 h 6 m |
| | >50 | >50 | >50 | >50 | >50 | 34 h 46 m |
| | >50 | >50 | >50 | >50 | >50 | 38 h 54 |
| | >50 | >50 | >50 | >50 | >50 | 40 h 44 m |
| | (x = 50) | (x = 50) | (x = 50) | (x = 50) | (x = 50) | (x = 36) |
| SAFT (° C.) | 87.5 | 87.5 | 88 | 88 | 88.5 | 84 |
| Steel 25 mm × 125 mm 0.5 Kg | | | | | | |
| Viscosity @ 175° C. (mpa) | 75000 | 76000 | 74000 | 74000 | 78000 | 59000 |
| Spindle 272.5 rpm after 2 hrs | | | | | | |
| Coating temperature (° C.) | 185 | 185 | 185 | 185 | 185 | 185 |

| | Ex. 7 | Ex. 8 | Ex. 9 | Ex. 10 | Ref. Tape |
|---|---|---|---|---|---|
| V 8508 | 70 | 60 | 40 | 30 | |
| V4111 | 30 | 40 | 60 | 70 | |
| ECR 373 | 70 | 60 | 40 | 30 | |
| E 2203 | 30 | 40 | 60 | 70 | |
| Flexon 876 | 10 | 10 | 10 | 10 | |
| Irganox 565 | 1 | 1 | 1 | 1 | |
| 180° C. Peel Strength on steel (N/cm) | | | | | |
| initial | 6.11 | 6.16 | 6.37 | 6.48 | 2.48 |
| 3 days open air | 5.63 | 5.87 | 6.13 | 6.00 | 2.40 |
| 1 week open air | 4.77 | 4.91 | 5.07 | 4.85 | 2.51 |
| Loop Tack on steel at RT (N/26 mm) | | | | | |
| Initial | 16.5 | 18.0 | 18.1 | 20.9 | 9.5 |
| 3 days open air | 11.7 | 13.3 | 14.2 | 15.5 | 17.1 |
| 1 week open air. | 2.3 | 2.3 | 2.6 | 4.85 | 8.4 |
| Loop Tack at 5° C. (N/25 mm) | | | | | |
| Steel | 18.8 | 20.4 | 20.5 | 19.4 | 7.0 |
| Cardboard | 5.7 | 5.5 | 5.7 | 5.7 | 5.1 |
| Ball Tack (cm) | | | | | |
| Initial | 2.0 | 2.0 | 2.0 | 2.0 | 3.0 |
| 3 days open air | 9.5 | 8.0 | 9.0 | 7.5 | 4.0 |
| 1 week open air | >15 | >15 | >15 | >15 | 3.0 |
| Shear at RT (hours) | | | | | |
| Cardboard 25 mm × 12.5 mm 1 Kg | >120 | >120 | >120 | >120 | >120 |
| | >120 | >120 | >120 | >120 | >120 |
| Shear at 40° C. (hours) | | | | | |
| Cardboard 25 mm × 12.5 mm 1 Kg | 30 h 30 m | 46 h 47 m | 48 h 20 m | >50 | 33 h 6 m |
| | 40 h 12 m | >50 | >50 | >50 | 35 h 10 m |
| | >50 | >50 | >50 | >50 | 41 h 46 m |
| | >50 | >50 | >50 | >50 | 34 h 31 m |
| | (x = 43) | (x = 50) | (x = 50) | (x = 50) | (x = 36) |
| SAFT (° C.) | 84 | 84.5 | 86.5 | 85 | n.a. |
| Steel 25 mm × 125 mm 0.5 Kg | | | | | |
| Viscosity @ 175° C. (mpa) | 67000 | 73000 | 84000 | 95000 | — |
| Spindle 272.5 rpm after 2 hrs | | | | | |
| Coating temperature (° C.) | 185 | 185 | 185 | 185 | |

Examples 11–13

Three additional adhesive compositions were prepared by blending the materials recited in Table 2 in a 4 liter blender at 145° C. for a period of 45 minutes. The adhesive was then pumped trough a coating die on to an OPP film. As a comparison a reference tape was also prepared using only a SIS block copolymer as the elastomer with a SIS compatible tackifier.

The formulations and physical properties of the various formulations are shown in Table 2.

Examples 11 and 12 are comparative examples showing the results achieved when the elastomeric component comprises a blend of SIS and SBS copolymers but where the tackifier component comprises a SIS compatible resin alone. As can be seen from the aged ball tack and loop tack values of examples 11 and 12, the use of a SIS compatible resin alone does not work in the invention. Example 13 represents an adhesive composition of the present invention. As seen from the data in Table 2, the physical properties of the adhesive composition more closely match the reference tape than the other examples.

TABLE 2

|  | Ex. 11 | Ex. 12 | Ex. 13 | Ref. Tape |
|---|---|---|---|---|
| V 8508 | 30 | 20 | 30 |  |
| V4111 | 70 | 80 | 70 | 100 |
| ECR 373 | — | — | 30 |  |
| E 2203 | 110 | 110 | 80 | 110 |
| Flexon 876 | 10 | 10 | 10 | 10 |
| Irganox 1076 | 1 | 1 | 1 | 1 |
| 180° C. Peel Strength on steel (N/cm) |  |  |  |  |
| Initial | 5.84 | 5.53 | 5.53 | 5.88 |
| 3 days open air | 5.20 | 5.11 | 4.40 | 4.33 |
| Loop Tack on steel at RT (N/25 mm) |  |  |  |  |
| Initial | 19.5 | 21.9 | 22.1 | 22.0 |
| 3 days open air | 14.3# | 16.6# | 16.4# | 16.4 |
| 1 week open air |  |  | 17.0# | 14.0#,* |
| # Jerking, max value |  |  |  | *Scat. Results |
| Ball Tack (cm) |  |  |  |  |
| Initial | 2.0 | 1.5 | 1.5 | 1.5 |
| 1 day open air | >20 | >20 | 17.5 | 8.5 |
| 3 days open air | >20 | >20 | >20 | >20 |
| 1 week tape roll @ 50° C. |  |  | 1.5 | 3.5* *Scat. Results |
| Shear at RT (hours) |  |  |  |  |
| Cardboard 25 mm × 12.5 mm 1 Kg | >100 >100 | >100 >100 | >100 >100 | >100 >100 |
| Shear at 40° C. (hours) |  |  |  |  |
| Cardboard 25 mm × 2.5 mm 1 Kg | 13 h 4 m 15 h 38 m 14 h 11 m 20 h 16 m | 43 h 31 m 4 h 23 m 21 h 24 m 11 h 56 m | 22 h 33 m 28 h 59 m 39 h 44 m 34 h 55 m | 23 h 14 m 6 h 55 m >50 |
| SAFT (° C.) |  |  |  |  |
| Steel 25 mm × 25 mm 0.5 Kg | 86.8 | 89.7 | 88.9 | 91.8 |
| Viscosity @ 175° C. (mPa) |  |  |  |  |
| Spindle 272.5 rpm after 2 hrs | 83000 | 87000 | 60000 | n.a |
| Box Closure @ RT |  |  |  |  |
| Recycled | n.a. | n.a | >100 hrs | >100 hrs |
| Non-recycled |  |  | >100 hrs | >100 hrs |
| Box Closure @ 40° C. |  |  |  |  |
| Recycled | n.a. | n.a. | >100 hrs | 8 hrs |
| Non-recycled |  |  | >100 hrs | 36 hrs |

Comparative Examples A–I

In the next series of examples, adhesive compositions were prepared using SBS copolymers as the elastomeric component. The samples were prepared in the manner described above and were applied to Mylar tape instead of OPP. The results achieved with Mylar are believed to have a direct correlation to the results expected from OPP.

Formulation and physical property data for the various formulations are shown in Table 3.

As can be seen from the data in Table 3 especially when compared with the adhesive compounds of the invention and the reference tape in Table 2, the SBS based adhesive formulations exhibit poor loop tack and ball tack after three days of open air aging. Further, shear on cardboard at 40° C. is very low.

TABLE 3

|  | Ex. A | Ex. B | Ex. C | Ex. D | Ex. E | Ex. F | Ex. G | Ex. H | Ex. I |
|---|---|---|---|---|---|---|---|---|---|
| DPR 1020 | 100 | - | - | 100 | - | - | 100 | - | - |
| TR 1102 | - | 100 | - | - | 100 | - | - | 100 | - |
| VECTOR 8508 | - | - | - | - | - | 100 | - | - | 100 |
| ECR 373 | 120 | 120 | 120 | 124 | 124 | 124 | 110 | 110 | 110 |
| FLEXON 876 | 5 | 5 | 5 | 10 | 10 | 10 | 10 | 10 | 10 |
| IRGANOX 565 | 1 | 1 | 1 | 1 | 1 | 1 | 1 | 1 | 1 |
| 180° C. Peel Strength on steel (N/cm) |  |  |  |  |  |  |  |  |  |
| initial | 6.05 | 6.93 | 6.59 | 5.95 | 6.45 | 6.27 | 5.73 | 5.97 | 5.95 |
| 3 days open air | 5.97 | 6.24 | 6.19 | 5.65 | 6.35 | 5.89 | 5.09 | 6.00 | 5.55 |

TABLE 3-continued

|  | Ex. A | Ex. B | Ex. C | Ex. D | Ex. E | Ex. F | Ex. G | Ex. H | Ex. I |
|---|---|---|---|---|---|---|---|---|---|
| Loop Tack on steel at RT (N/26 mm) | | | | | | | | | |
| Initial | 20.0 | 22.3 | 22.3 | 19.5 | 20.6 | 17.5 | 16.2 | 23.0 | 14.3 |
| 3 days open air | 8.1 jerk. Max | 5.1 jerk. Max | 4.7 jerk max | 5.9 jerk. Max | 8.9 jerk. Max | 4.6 jerk. Max | 5.1 jerk max | 2.5 jerk. Max | 2.6 jerk. Max. |
| Ball Tack (cm) | | | | | | | | | |
| Initial | 2.5 | 6.0 | 4.5 | 2.5 | 4.0 | 4.0 | 2.5 | 5.5 | 4.5 |
| 3 days open air | >15 | >15 | >15 | >15 | >15 | >15 | >15 | >15 | >15 |
| Shear at RT (hours) | | | | | | | | | |
| Cardboard 25 mm × 12.5 mm 1 Kg | >120 >120 | >120 >120 | >120 >120 | >120 >120 | >120 >120 | >120 >120 | >120 >120 | >120 >120 | >120 >120 |
| Shear at RT (hours) | | | | | | | | | |
| Cardboard 25 mm × 12.5 mm 1 Kg | 4 h 6 m 5 h 1 m 5 h 41 m 8 h 16 m | 3 h 34 m 3 h 57 m 6 h 3 m 9 h 17 m | 6 h 20 m 12 h 57 m 12 h 7 m 12 h 31 | 5 h 42 m 6 h 32 m 6 h 42 m 7 h 15 m | 7 h 8 m 14 h 28 m 16 h 17 m 21 h 6 m | 3 h 14 m 3 h 42 m 10 h 16 m 10 h 20 m | 5 h 31 m 5 h 59 m 10 h 46 m 11 h 51 m | 25 h 31 m 26 h 48 m 30 h 32 m 30 h 43 m | 16 h 9 m 17 h 12 m 28 h 57 m 32 h 0 m |
| SAFT (° C.) | | | | | | | | | |
| Steel 25 mm × 125 mm 0.5 Kg | 79 | 84 | 78 | 77 | 82 | 77.5 | 79 | 87 | 80 |
| Coating temperature (° C.) | 185 | 185 | 185 | 185 | 185 | 185 | 185 | 185 | 185 |

Examples 14–16

Another series of adhesive compositions were prepared following the technique outlined above. In Example 15, Cariflex TR 1102 was used as the SBS copolymer. In example 15, Escorez 1310 was used as the SIS compatible resin. This demonstrates that a SIS compatible resin with very low levels on aromaticity can be used in the practice of the invention.

Formulation and physical property data for the various formulations is shown in Table 4.

The examples recited above are merely illustrative of the present invention and are not meant to limit the scope of the invention.

TABLE 4

|  | Ex. 14 | Ex. 15 | Ex. 16 |
|---|---|---|---|
| Vector 4111 | 70 | 70 | 70 |
| Vector 8508 | 30 | — | 30 |
| Cariflex TR1102 | — | 30 | — |
| Escorez 2203 | 80 | 80 | — |
| Escorez 1310 | — | — | 80 |
| ECR 373 | 30 | 30 | 30 |
| Flexon 876 | 10 | 10 | 10 |
| Irganox 1076 | 1 | 1 | 1 |
| 180° C. Peel Strength on steel (N/cm) | | | |
| Initial | 6.87 | 6.93 | 7.24 |
| 3 days open air | 6.57 | 6.87 | 7.0 |
| Loop Tack on steel at RT (N/25 mm) | | | |
| Initial | 26.5 | 24.6 | 23.3 |
| 3 days open air *scattered results | 14.7* | 13.1* | 22.1 |
| Ball Tack (cm) | | | |
| Initial | 1.5 | 1.5 | 1.5 |
| 3 days open air *scattered results | 3.0* | 3.0* | 2.0 |
| Shear at RT (hours) | | | |
| Cardboard 25 mm × 12.5 mm 1 Kg | >100 >100 | >100 >100 | >100 >100 |

TABLE 4-continued

|  | Ex. 14 | Ex. 15 | Ex. 16 |
|---|---|---|---|
| Shear at 40° C. (hours) | | | |
| Cardboard 25 mm × 12.5 mm 1 Kg | >50 >50 >50 | >50 >50 >50 | 16 h 46 m 19 h 24 m 25 h 24 m 12 h 29 m |
| SAFT (° C.) | | | |
| Steel 25 mm × 125 mm 0.5 Kg | 90.8 | 95.0 | 92.6 |
| Viscosity @ 175° C. (mPa) | | | |
| Spindle 272.5 rpm after 2 hrs | 60000 | 66400 | 81200 |

Examples 17–23

In addition to materials previously described, additional materials used in the preparation of adhesive compositions in Examples 17–23 are as follows:

| Vector 4511 SIS | A linear polystrene-polyisoprene-polystyrene triblock supplied by Dexco Polymers having a styrene content of 17.5 to 19 wt %, a melt flow rate of 12.5 to 17 g/10 min, a number average Mol. Wt of ca 120 000 and less than 0.1 wt % diblock. |
|---|---|
| ECR 411 | An aliphatic/aromatic hydrocarbon resin made by Exxon Chemical, having a ring and ball softening Point of 92 degC, an aromatic content of 7–10% equivalent styrene and a number average molecular weight of about 1050. |
| Escorez 5690 | A hydrogenated, aromatic modified cycloaliphatic hydrocarbon resin made by Exxon Chemical having a ring and ball softening point of 90 degC, a styrene content of about 23% and a number average Mol. Wt. of 250. |
| Quintoine U 190 | An aliphatic/aromatic hydrocarbon resin supplied by Nippon Zeon having a ring and ball softening point of 89 degC and a number average Mol. Wt. Of 1000. |

-continued

| | |
|---|---|
| DPR 1020-19 | An experimental styrene-butadiene-stryene block Copolymer prepared by Dexco Polymers having a Styrene content of about 25% and less than 0.1% Diblock. |

The adhesive composition were prepared by mixing the ingredients as set forth in Table 5. Examples 17–23 were prepared in a manner similar to the preparation of Examples 1–10. Example 17–19 were prepared with a aliphatic aromatic resin as second resin while Example 20 was prepared with a hydrogenated cycloaliphatic, aromatic modified resin as second resin. Examples 17–23 show good tack and shear properties at 40° C. Examples 22 and 23 were prepared with SBS compatible resins as single tackifiers. It is apparent that the shear at 40° C. is lower than for the other Examples.

TABLE 5

| SBS = DPR 1020 | EX 17 | EX 18 | EX 19 | EX 20 | EX 21 | EX 22 | EX 23 |
|---|---|---|---|---|---|---|---|
| Vector 4511 | 50 | 50 | 50 | 60 | 40 | 40 | 50 |
| DPR 1020 | 50 | 50 | 50 | 50 | 60 | 60 | 50 |
| ECR-411 | 55 | 80 | 70 | 55 | 70 | | |
| ECR-373 | 55 | 30 | 40 | | 40 | | |
| Escorez 5690 | | | | 55 | | 110 | |
| Quintone U 190 | | | | | | | 110 |
| Flexon 876 | 10 | 10 | 10 | 10 | 10 | 10 | 10 |
| Irganox 565 | 1 | 1 | 1 | 1 | 1 | 1 | 1 |
| 180° peel adhesion (N/cm) | | | | | | | |
| -initially | 6.49 | 6.58 | 6.51 | 5.96 | 6.80 | 5.43 | 6.52 |
| -3 days open air | 6.15 | 6.47 | 6.43 | 5.62 | 6.58 | 5.19 | 5.93 |
| Loop tack @ RT (N/25 mm) | | | | | | | |
| -initially (steel) | 23.0 | 22.5 | 22.7 | 23.3 | 22.3 | 20.5 | 23.2 |
| -3 days open air | 22.1 | 22.3 | 19.8 | 20.2 | 19.7 | 14.0 | 21.4 |
| Ball tack (cm) | | | | | | | |
| -initially | 2.0 | 2.5 | 2.0 | 1.5 | 3.0 | 2.0 | 1.5 |
| -3 days open air | 10.0 | 12.5(56.5 > 15) | 9.0 | 6.5 | 11.0(6.5 > 15) | 14.0(13 > 15) | 12.5 |
| Shear on cardboard @ RT 12.5 mm*25 mm - 1 kg (hrs) | >100 >100 | >100 >100 | >100 >100 | >100 >100 | >100 >100 | >100 >100 | >100 >100 |
| Shear on cardboard @ 40° C. 12.5 mm*25 mm - 1 kg (hrs) | 10 h 27'af 19 h 20'af 9 h 44'af 21 h 51'af | 23 h 47'af 41 h 14'af >50 17 h 20'af | 32 h 35'af 49 h 48'af 23 h 49'af 49 h 33'af | 22 h 46'cf- 7 h 48'-cf 35 h 30'-cf 18 h 56'-cf | 23 h 59'af 10 h 17'af 16 h 35'af | 3 h 05'-cf 5 h 00'-cf 4 h 58'-cf 5 h 35'-cf | 6 h 40'af 4 h 46'af 6 h 01'af 7 h 03'af |
| SAFT (° C.) 12.5 mm x 25 mm - 0.5 kg | 86.9cf | 89.1cf | 89.5cf | 84.5cf | 88.6cf | 76.4cf | 85.2cf |
| Blend viscosity @ 175° C. (cps) Spindle 272.5 rpm after 2 hrs | 70800 | 77600 | 73800 | 74800 | 77400 | 76500 | 78600 |
| Coating weight (gsm) | | | | 18–20 | | | |

While the present invention has been described and illustrated by reference to particular embodiments, those of ordinary skill in the art will appreciate that the invention lends itself to many different variations not illustrated herein. For these reasons, then, reference should be made solely to the appended claims for purpose of determining the true scope of the present invention.

Although the appendant claims have single appendencies in accordance with U.S. patent practice, each of the features in any of the appendant claims can be combined with each of the features of other appendant claims of the independent claim.

We claim:

1. A hot melt pressure sensitive adhesive composition comprising
   a) an elastomeric component comprising
      i) a styrene-isoprene styrene block copolymer, and
      ii) a styrene-butadiene styrene block copolymer, and
   b) a tackifier component comprising
      i) a first hydrocarbon resin compatible with the styrene-isoprene styrene block copolymer and
      ii) a second hydrocarbon resin compatible with the styrene-butadiene styrene block copolymer.

2. The hot melt adhesive composition of claim 1 wherein the first hydrocarbon resin has a monovinyl aromatic compound content of less than 21 wt % and the second hydrocarbon resin has a monovinyl aromatic compound content of from at least 20 wt % to 45 wt %.

3. The hot melt adhesive composition of claim 1 wherein the styrene-isoprene block copolymer has a styrene content of from 10 to 30 wt % styrene and a diblock content of from 0 to 65 wt %.

4. The hot melt adhesive composition of claim 1 wherein the styrene-butadiene block copolymer has a styrene content of from 10 to 40 wt % and a diblock content of from 0 to 35 wt %.

5. The hot melt adhesive composition of claim 1 wherein the first hydrocarbon resin has a ring-and-ball softening point of from 70° to 140° C. and the second hydrocarbon resin has a ring-and-ball softening point of from 50 to 140° C.

6. The hot melt adhesive composition of claim 1 wherein the styrene-isoprene block copolymer comprises from 20 to 80 wt % of the elastomeric component.

7. The hot melt adhesive composition of claim 1 wherein the first hydrocarbon resin comprises from 20 to 80 wt % of the tackifier component.

8. A hot melt adhesive composition comprising:
   (a) 40 to 60 wt % of an elastomeric component, the elastomeric component comprising:
      (i) 80 to 20 wt % of a styrene-isoprene block copolymer, and
      (ii) 20 to 80 wt % of a styrene-butadiene block copolymer, and (b) 60 to 40 wt % of a tackifier component, the tackifier component comprising:
   (i) 80 to 20 wt % of a first hydrocarbon resin, the first hydrocarbon resin compatible with the styrene-isoprene block copolymer, and
   (ii) 20 to 80 wt % of a second hydrocarbon resin, the second hydrocarbon resin compatible with the styrene-butadiene sytrene block copolymer.

9. The hot melt adhesive of claim 8 wherein the styrene-isoprene copolymer has a styrene content of from 10 to 30 wt % and a diblock content of from 0 to 65 wt % and wherein the styrene-butadiene block copolymer has a styrene content of from 10 to 40 wt % and a diblock content of from 0 to 35 wt %.

10. The hot melt adhesive of claim 8 wherein the first hydrocarbon resin has a ring-and-ball softening point of from 70 to 140° C. and a monovinyl aromatic compound content of less than 21 wt % and wherein the second hydrocarbon resin has a ring-and-ball softening point of from 50 to 140° C. and a monovinyl aromatic compound content of from 20 to 45 wt %.

11. The hot melt adhesive composition of claim 8 wherein the first hydrocarbon resin has a monovinyl aromatic compound content of 5 to 20 wt %.

12. An adhesive tape comprising:
   (a) an oriented polypropylene film
   (b) a hot melt adhesive composition comprising:
      (i) an elastomeric component comprising:
         (a) a styrene-isoprene block copolymer, and
         (b) a styrene-butadiene block copolymer; and
      (ii) a tackifier component comprising:
         (a) a first hydrocarbon resin compatible with the styrene-isoprene block copolymer, and
         (b) a second hydrocarbon resin compatible with the styrene-butadiene block copolymer
   wherein the hot melt adhesive composition is applied to one side of the oriented polypropylene film.

13. The adhesive tape of claim 12 wherein the elastomeric component comprises from 40 to 60 wt % of the hot melt adhesive and wherein the tackifier comprises from 60 to 40 wt % of the hot melt adhesive.

14. The adhesive tape of claim 12 wherein the elastomeric component comprises 80 to 20 wt % of a styrene-isoprene block copolymer and from 20 to 80 wt % of the styrene-butadiene block copolymer.

15. The adhesive tape of claim 14 where the styrene-isoprene block copolymer has a styrene content of from 10 to 30 wt % and a diblock content of from 0 to 65 wt % and wherein the styrene-butadiene block copolymer has a styrene content of from 10 to 40 wt % and a diblock content of from 0 to 35 wt %.

16. The adhesive tape of claim 12 wherein the first hydrocarbon resin has a monovinyl aromatic compound component of less than 21 wt % and wherein the second hydrocarbon resin has a monovinyl aromatic compound content of from 20 to 45 wt %.

17. The hot melt adhesive composition of claims 1 to 11 wherein
   a) the styrene-isoprene block copolymer has the formula $(S-I)_{n-1}S$;
   b) n=2 to 8;
   c) the styrene-butadiene block copolymer as the formula $(S-B)_{m-1}S$; and
   d) m=2 to 8.

18. The hot melt adhesive of claim 17 wherein n=2 to 4 and m=2 to 4.

19. The hot melt adhesive of claim 18 wherein n=2 and m=2.

20. The hot melt adhesive of claim 17 wherein the styrene-isoprene-styrene block copolymer has a melt flow rate as measured by ASTM D 1238—82 condition G of 5 to 40 g/10 min.

21. The hot melt adhesive of claim 17, wherein
   a) the SBS tackifier resin has a ring-and-ball softening point of 85 to 105 °C;
   b) a number average molecular weight of 800 to 1200; and
   c) a weight average molecular weight of 1200 to 2000;
   d) a molecular weight distribution of 1.3–2.5; and
   e) a Z average value of 3000 to 4000.

22. The hot melt adhesive of claim 17 wherein the SBS tackifier resins have
   a) a ring-and-ball softening point of 70 to 95 °C; and
   b) wherein 20 to 45 wt % of the resin result from polymerization of olefinically unsaturated aromatic monomer.

23. The hot melt adhesive of claim 17 wherein
   a) the SBS tackifier resin has a ring-and-ball softening point of 85 to 105 °C;
   b) a number average molecular weight of 800 to 1200;
   c) a weight average molecular weight of 1200 to 2000;
   d) a molecular weight distribution of 1.3–2.5; and
   e) a Z average value of 3000 to 4000;
   and wherein
   f) the SBS tackifier resins hae a ring-and-ball softening point of 70 to 95 °C; and
   g) 20 to 45 wt % of the resin resulted from polymerization of olefinically unsaturated aromatic monomer.

24. The hot melt adhesive of claim 17 additionally comprising one more other components are selected from hydrocarbon extender oils, antioxidants, colorants, or fillers.

25. The hot melt adhesive of claim 24 wherein 21 or more other components are selected from aromatic oils, naphthenic oils, paraffinic oils, 2,6-di-t-butyl-4-methylphenol, 1,3,5-trimethyl-2,4,6-tris (3',5'-di-t-butyl-4'-hydroxybenzyl)-benzene, tetrakis [(methylene(3,5-di-t-butyl-4-hydroxyhydrocinnamate)] methane, octadexyll-3,5-di-t-butyl-4-hydroxy cinnamate.

* * * * *

UNITED STATES PATENT AND TRADEMARK OFFICE
CERTIFICATE OF CORRECTION

PATENT NO. : 6,384,138 B1
DATED : May 7, 2002
INVENTOR(S) : Lutz E. Jacob et al.

It is certified that error appears in the above-identified patent and that said Letters Patent is hereby corrected as shown below:

Column 9,
Line 55, Table 1, replace "Loop Tack on steel at RT (N/26 mm)" with -- Loop Tack on steel at RT (N/25 mm) --.

Column 10,
Line 27, replace "36 micron OPP film" with -- 36 micron polyester film --.

Column 11,
Line 11, Table 1, replace "Steel 25 mm x 125 mm" with -- Steel 25 mm x 12.5 mm -- .
Line 51, Table 1, replace "Spindle 272.5 rpm after 2 hrs" with -- Spindle 27, 2.5 rpm after 2 hrs --.
Line 59, replace "OPP" with -- polyester --.

Column 13,
Line 37, Table 2, replace "Spindle 272.5 rpm after 2 hrs" with -- Spindle 27, 2.5 rpm after 2 hrs --.
Lines 52 and 53, replace "OPP" with -- polyester --.

Column 15,
Line 3, Table 3, replace "Loop Tack on steel at RT (N/26 mm)" with -- Loop Tack on steel at RT (N/25 mm) --.
Line 22, Table 3, replace "Steel 25 mm x 125 mm" with -- Steel 25 mm x 12.5 mm -- .

UNITED STATES PATENT AND TRADEMARK OFFICE
CERTIFICATE OF CORRECTION

PATENT NO.     : 6,384,138 B1
DATED          : May 7, 2002
INVENTOR(S)    : Lutz E. Jacob et al.

It is certified that error appears in the above-identified patent and that said Letters Patent is hereby corrected as shown below:

<u>Column 16,</u>
Line 37, Table 4, replace "Steel 25 mm x 125 mm" with -- Steel 25 mm x 12.5 mm -- .
Line 39, Table 4, replace "Spindle 272.5 rpm after 2 hrs" with -- Spindle 27, 2.5 rpm after 2 hrs --.

Signed and Sealed this

Fifth Day of November, 2002

*Attest:*

*Attesting Officer*

JAMES E. ROGAN
*Director of the United States Patent and Trademark Office*